May 23, 1944.  J. C. TRAVILLA, JR  2,349,568
RAILWAY VEHICLE BODY AND RADIAL TRUCK ASSEMBLY
Filed Sept. 25, 1941  3 Sheets-Sheet 1

INVENTOR.
JAMES C. TRAVILLA, JR.
BY Rodney Bedell
ATTORNEY

May 23, 1944.   J. C. TRAVILLA, JR   2,349,568
RAILWAY VEHICLE BODY AND RADIAL TRUCK ASSEMBLY
Filed Sept. 25, 1941   3 Sheets-Sheet 2
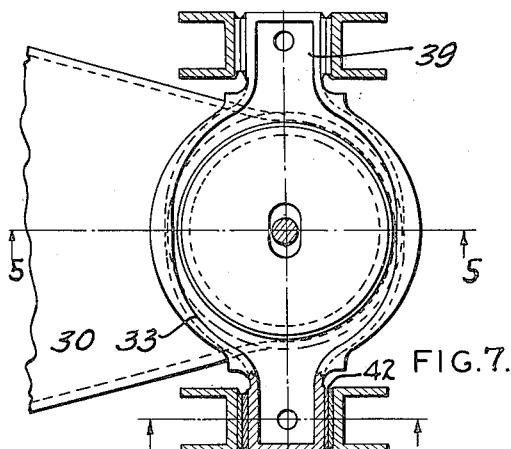
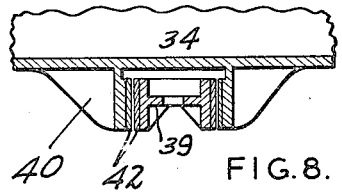
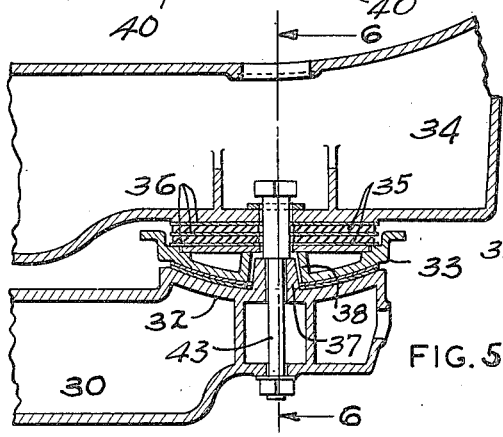
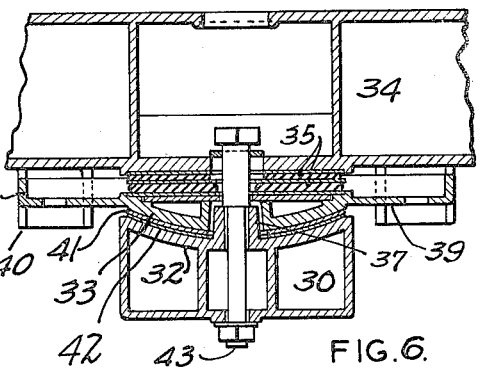
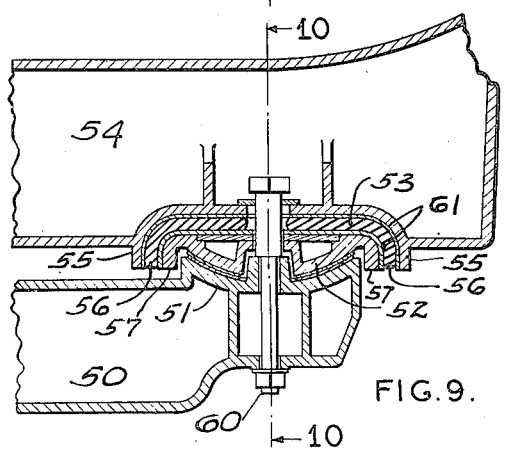
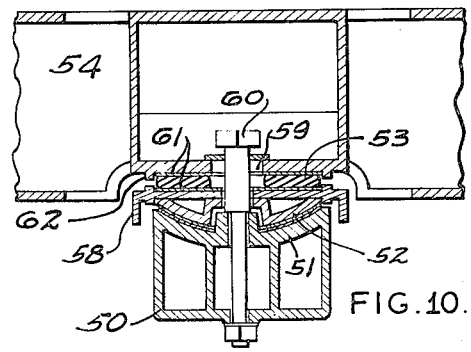
INVENTOR.
JAMES C. TRAVILLA, JR.
BY Rodney Bedell
ATTORNEY

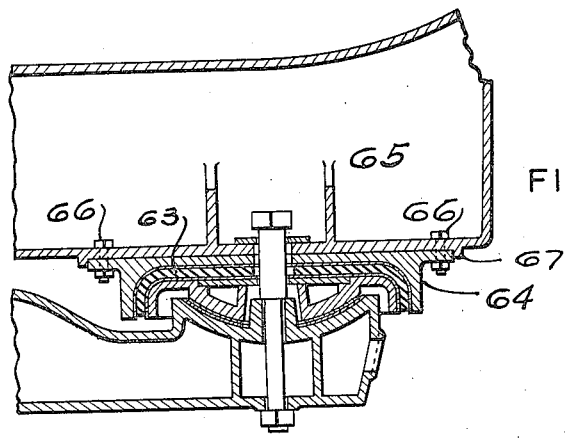
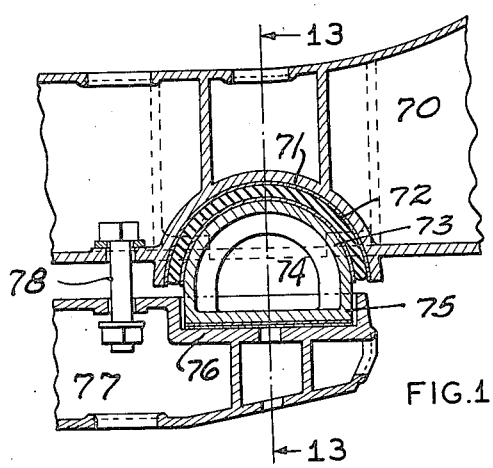
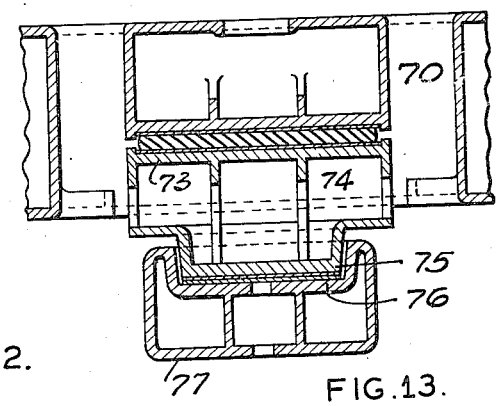
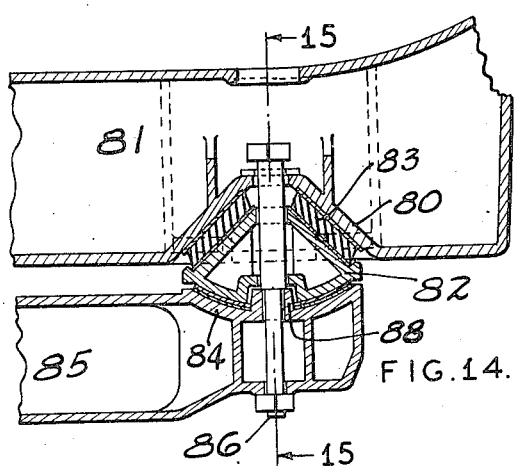
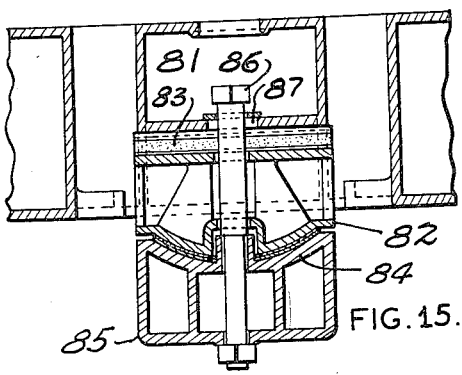

Patented May 23, 1944

2,349,568

UNITED STATES PATENT OFFICE 2,349,568

RAILWAY VEHICLE BODY AND RADIAL TRUCK ASSEMBLY

James C. Travilla, Jr., Philadelphia, Pa., assignor to General Steel Castings Corporation, Granite City, Ill., a corporation of Delaware Application September 25, 1941, Serial No. 412,206

15 Claims. (Cl. 105—174)

The invention relates to railway rolling stock and more particularly to railway vehicles in which the vehicle body is supported in part by a radial truck, i. e., a truck pivotally secured near one end to the body and supporting the body at points spaced longitudinally of the vehicle from the pivotal connection.

Such trucks are commonly used under the rear ends of locomotive engines, although not limited to such use, and such trucks frequently include a plurality of axles journaled in the truck frame.

When the vehicle is on curved track and the truck swings about its pivotal connection to the vehicle body, the longitudinal center lines of the truck and the vehicle body assume an angular relation and the movement of the pivotal connection between the truck and body laterally of the track tends to throw the truck wheels transversely of the track. This tendency has been compensated for by providing excessive lateral movement between one or more of the truck axles and the truck frame, or by eliminating the flanges on one or more pairs of the truck wheels, both of which expedients are undesirable from a design standpoint.

Scudder Patent 1,935,335, issued November 14, 1933, illustrates the pivotal assembly of the truck frame and vehicle body by means of a swinging link whereby the end of the truck frame connected to the vehicle body may move transversely of the vehicle body frame and thereby accommodate the lateral offsetting of the truck frame and body frame due to the guiding of the truck wheels by the track rails.

The main object of the present invention is to provide for the displacement of the truck and body frames near their pivotal connection by means of a simple, effective, economical center plate structure and thereby avoid excessive lateral play of the truck axles in the frame and the elimination of flanges on the truck wheels.

Other detailed objects of the invention will appear in the following description, reference being had to the accompanying drawings in which—

Figure 1:
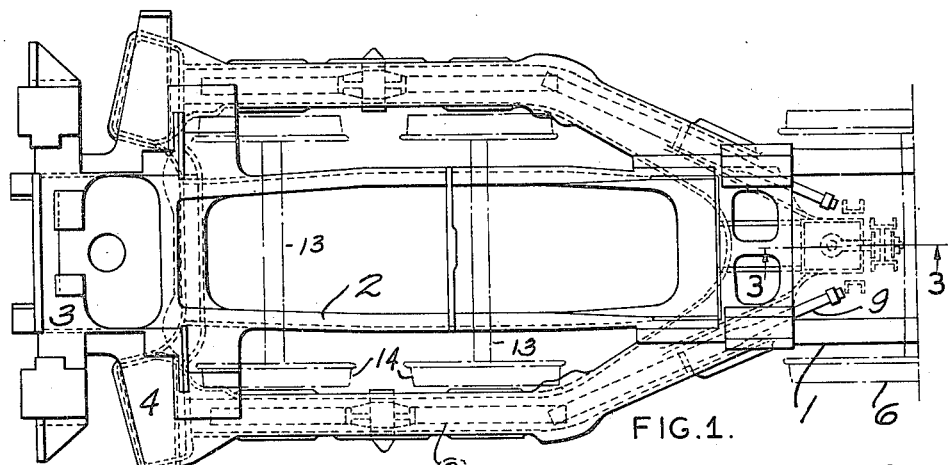
Figure 1 is a top view of the rear portion of a locomotive frame and a four-wheel truck supporting the same.
Figure 2:
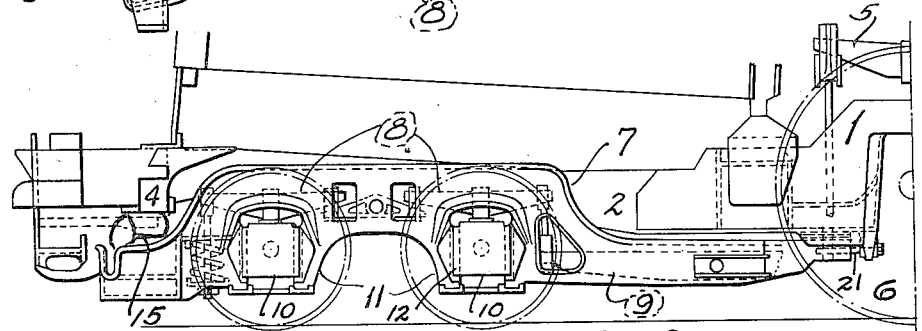
Figure 2 is a side elevation of the structure shown in Figure 1 with additional locomotive parts indicated.
Figures 3, 4:
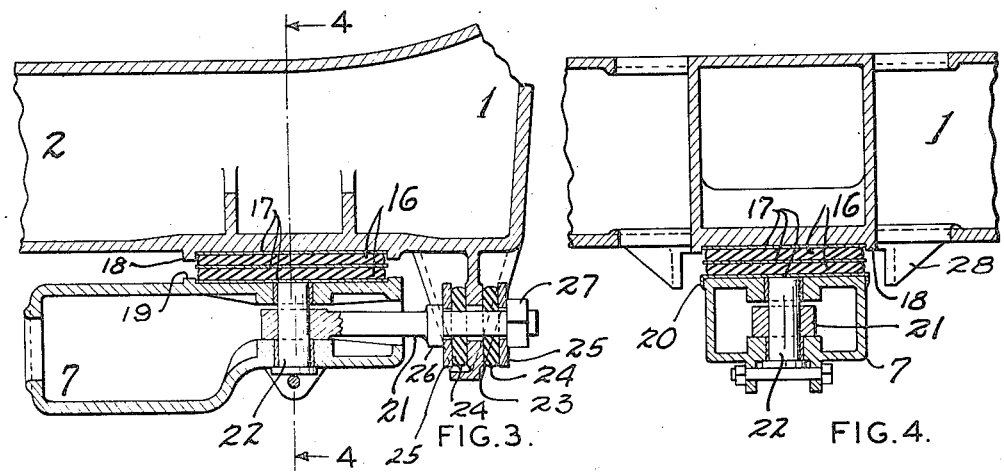
Figure 3 is a vertical longitudinal detailed section taken on the line 3—3 of Figure 1 and drawn to an enlarged scale.
Figure 4 is a vertical transverse section taken on the line 4—4 of Figure 3.

Figures 5, 9, 11, 12 and 14 correspond to Figure 3 but illustrate respectively different forms of the invention.

Figures 6, 10, 13 and 15 correspond to Figure 4 but illustrate respectively the structures illustrated in Figures 5, 9, 12 and 14 and are taken on the corresponding section lines of the latter mentioned figures.

Figure 7 is a top view of the center plate structure shown in Figures 5 and 6.

Figure 8 is a detailed section taken on the line 8—8 of Figure 7.

The structure illustrated in Figures 1–4 includes a locomotive main frame 1 having a rear extension or cradle 2 terminating in a rear deck 3 including laterally extending wings 4. The main frame is supported primarily upon a spring suspension, the rear end of which is indicated at 5, mounted upon a series of driving wheels and axles, the rearmost of which is indicated at 6.

Beneath the locomotive cradle is a trailer truck comprising a rigid frame 7 supported by a spring system indicated at 8 and mounted upon a plurality of axle journal boxes 10 slidable vertically in truck frame pedestals 11 and held against transverse movement in the frames by opposing box flanges 12 and adjacent faces of the pedestals. The boxes are supported by the journals of axles 13 mounting the wheels 14. The truck spring system is equalized at 9 to the locomotive main spring system.

The rear end of the truck frame mounts rocker bearings 15 on which rest the cradle wings 4 so that the cradle and truck may move transversely of each other.

All of the above described structure is well known in the art and conforms to general practices except that usually one or more of the truck axles and their journal boxes are provided with substantial movement transversely of the truck frame for the purpose hitherto mentioned.

The forward end of the truck frame is pivotally connected to the locomotive frame by a simple center plate device comprising one or more rubber pads 16 with opposing faces vulcanized or otherwise bonded to plates 17. Upper plate 17 bears against the lower face of the body frame and is positioned by shear lugs 18 depending from the body frame. Lower plate 17 bears against the upper face of the truck frame and is positioned thereon by upstanding shear lugs 19, in front and at the rear of the center plate, and by the downturned flanges 20 at the sides of the plate embracing the adjacent portions of the truck frame between them.

This center plate construction provides for the relative pivotal movement of the frames and also for their relative transverse movement as may be necessary to accommodate the lateral thrust of the rails against the truck wheels and, through the latter, the truck frame.

The rubber will distort under lateral and torsional shear so as to provide a gradually increasing lateral and radial resistance to the relative movements of the frames and thereby tend to return them to their normal relative positions.

The center plate is not relied upon to resist the longitudinal forces between the frames or to prevent their longitudinal displacement. For this purpose there is provided a link or tie rod 21 with one end surrounding a pin 22 seated in the truck frame and with its other end extending through a bracket 23 depending from the body frame.

Pads 24 of rubber-like material are applied to the front and rear faces of bracket 23, and washers 25 on the opposite sides of pads 24 are clamped between a shoulder 26 on rod 21 and a nut 27 threaded on the end of the rod.

Rubber pads 24 yield to the extent necessary to accommodate lateral movement of the forward end of the truck frame relative to the body frame, but pads 24 resist and cushion the longitudinal forces between the frames without placing any substantial shear load on center plate pads 16.

Safety lugs 28 depend from the body frame at opposite sides of the narrow forward portion of the truck frame and function to hold the latter against excessive lateral movement in the event of removal or complete failure of the center plate pads.

In the arrangement shown in Figures 5–8, the forward end of the truck frame 30 terminates in an upwardly facing concave spherical center plate element 32, and a corresponding downwardly facing convex spherical center plate element 33 is mounted on the body frame 34 by means of one or more rubber-like pads 35 and plates 36 to which they are bonded, the lowermost plate being secured against movement in center plate element 33 and the uppermost plate being secured to the bottom face of body frame 34.

The spherical contours of the engaging surfaces of truck frame center plate 32 and the separate center plate 33 resist horizontal displacement of these two parts when the vertical load is transmitted between them.

An upstanding boss 37 on the truck frame is received loosely in a recess 38 in body center plate element 33, and elements 37 and 38 positively prevent horizontal displacement of the two center plate elements if for any reason the vertical load is reduced and there is a tendency to horizontal sliding action between these two elements. Element 33 is provided with lateral extensions 39 each received between a corresponding pair of lugs 40 depending from the body frame. Preferably the opposing faces of elements 32 and 33 and elements 39 and 40 are provided with wear plates 41 and 42 respectively which may be of hardened metal to reduce wear and may be renewable to maintain the initial contours and clearances between the parts. The tie bolt 43 secures the body and truck frames against disassembly.

With this structure the rubber pads 35 yield to accommodate movement of the forward end of the truck frame laterally to the body frame, and while these pads may yield to torsional forces, they will not be submitted to such forces due to the interengagement of extension 39 and lugs 40 on the center plate 33 and body frame respectively. Pivotal action between the truck and frame is provided between the interengaging spherical surfaces of center plate elements 32 and 33 since the center plate elements 32 and 33 may pivot on each other in the conventional manner.

In Figures 9 and 10 the forward portion 50 of the truck frame, its center plate element 51, and the adjacent portion of the body center plate element 52 correspond generally to the arrangement shown in Figures 5–8, but in this form of the invention the rubber pad 53, overlying center plate element 52, is received in a concave recess in body frame 54, and the front and rear portions of the recess, rubber pad and center plate have vertically disposed elements 55, 56 and 57 respectively which resist substantial relative movement of the body frame and center plate longitudinally of the vehicle. Relative lateral movement of these parts is facilitated by the spacing of the sides 58 of center plate 52 from any opposing elements on the body frame and by the transverse elongation of the opening 59 in the body frame for the tie bolt 60. Plates 61 bonded to opposite faces of the rubber pad are held against movement relative to the body frame and center plate by the shear lugs 62.

With this construction, transverse and pivotal movements of the two frames relative to each other are resisted by the shear value of the rubber pad although the longitudinal forces are also resisted by the resistance of the pad to compression between the vertically disposed elements 55 and 57 of the body frame and center plate.

Figure 11 illustrates a similar construction in which the rubber pad 63 is mounted in a seat member 64 formed separately from the body frame 65 and secured thereto by bolts 66 but held against horizontal shifting by shear lugs 67. In other respects the construction corresponds to that shown in Figures 9 and 10.

In the structure shown in Figures 12 and 13, the locomotive frame 70 has a semicylindrical recess or pocket 71 with its axis extending transversely of the vehicle, and a similarly shaped rubber pad 72 is seated in the pocket and in turn seats a semicylindrical arcuate top portion 73 of a center plate member 74 having a circular bottom portion 75 fitting within a correspondingly shaped center plate part 76 formed in the truck frame 77. A retaining or safety bolt 78 extends through the frames at one side of the center plate structure.

With this structure the rubber is placed in shear to accommodate relative lateral movement of the frames and relative tilting of the frames in a vertical longitudinal plane while the vertically disposed elements of the center plate parts prevent horizontal displacement and resist longitudinal forces between the body and truck frames.

Figures 14 and 15 illustrate a generally similar arrangement but instead of an arcuate construction of the pocket member 80 in body frame 81 and the center plate member 82, these parts are formed with flat inclined opposed surfaces extending transversely of the vehicle, and the rubber pads 83 between them, and the plates bonded thereto, have flat surfaces. The lower portion of member 82 is of spherical contour and fits in a similarly shaped center plate element 84 provided on the truck frame 85.

The inclined pads resist relative longitudinal movement of the frames but yield to accommodate relative transverse movement. Horizontal displacement of the center plate 82 relative to the truck frame is resisted due to the spherical contours of the engaging surfaces and positive displacement is prevented by means of the upright boss 88 on the truck frame at the center of the concave spherical portion, which boss projects into a recess in center plate 82. The safety bolt 86 extends through the adjacent center plate and frame parts, and the opening 87 for this bolt in the frame is elongated transversely of the vehicle to accommodate relative transverse movements of the center plates.

In all forms of the invention the rubber pads are placed under shear to accommodate relative lateral movements of the truck and body frames at the front end of truck and the rubber pads will act as centering device to keep the truck frame centered. The rubber pads will also act to cushion forces which otherwise would be transmitted undiminished between the frames. This results in less pounding, friction and noise and improves the operation and increases the useful life of the parts.

In all forms of the invention the rubber pads are positioned between the truck frame and the main frame so that there is no sliding friction between any of the parts or elements forming the pivotal connection between the front of the truck and the main frame due to the front portion of the truck moving laterally relative to the main frame. Both faces of the rubber pads are so positioned on the adjacent portion of the respective main frame and truck parts that there is no movement between the engaging surface portions of the rubber and the respective main frame or truck frame. Consequently, there can be no wear due to sliding friction on account of relative lateral movement of the main frame and the front end of the truck frame, and all relative lateral movement between the adjacent truck part and the adjacent main frame part is provided for by the distortion of the rubber in shear.

While the invention is particularly adapted for use in connection with plural axle radial trucks as illustrated, it is to be understood the invention is not so limited because some of the advantages will be retained if the invention is used in connection with two wheel trailer trucks.

In some forms of the invention, as in Figure 3, the rubber pad and its associated plates are attached directly to the locomotive framing, and in other forms, as in Figure 11, they are applied to a separately formed seat member which, in turn, is secured to the main frame.

It is to be understood that this arrangement is optional for each form of the invention and that other variations in the details of construction may be made without departing from the invention, and the exclusive use of all modifications coming within the scope of the claims is contemplated.

What is claimed is:

1. In a railway vehicle, a body frame member, a radial truck frame member having a pivotal connection at one end to said body frame member and supporting said body frame member at points spaced longitudinally of the vehicle from said connection, said connection comprising an element associated with said body frame member, an element associated with said truck frame member, and a pad of rubber-like material having its opposite faces secured to said elements respectively whereby said pad may distort under shear to accommodate relative movement of the adjacent portions of said members laterally of the vehicle and free of sliding action in such movement between said elements.

2. A railway vehicle as described in claim 1 which also includes means limiting the relative movement of the body and truck frame members laterally of the vehicle at said connection, and means independent of the parts forming said connection for resisting forces applied between the body and truck frame members longitudinally of the vehicle.

3. In a railway vehicle, a body frame member, a radial truck frame member having a pivotal connection at one end to said body frame member and supporting said body frame member at points spaced longitudinally of the vehicle from said connection, said connection including metal elements arranged one above the other and a pad of rubber-like material with its upper face in fixed relation with one of said elements and its lower face in fixed relation with the other of said elements, said pad extending in substantially straight lines transversely of the vehicle and being free to distort under shearing forces applied transversely of the vehicle and being of sufficient thickness and flexibility to yield to such shearing forces to accommodate lateral displacement of the connected portions of said members from their normal relative positions and said pad being of sufficient resiliency to offer a yielding resistance to such displacement.

4. In a railway vehicle, a body frame member, a radial truck frame member having a center plate connection at one end to said body frame member and supporting said body frame member at points spaced longitudinally of the vehicle from said connection, said connection including individual plates in fixed relation to said members and a pad of rubber-like material bonded to said plates and yieldingly resisting movement of said plates horizontally by the resistance of the pad to shear.

5. In a railway vehicle, a body frame member, a radial truck frame member having a pivotal connection at one end to said body frame member and supporting said body frame member at points spaced longitudinally of the vehicle from said connection, said connection including a pad of rubber-like material with its upper face in fixed relation with one of said members and its lower face in fixed relation with the other of said members and being of sufficient thickness and flexibility to accommodate lateral displacement of the connected portions of said members from their normal relative positions and of sufficient resiliency to offer a yielding resistance to such displacement, the body frame member having a depending bracket at one side of the pivotal connection, and a horizontally disposed link for resisting forces applied between said frames longitudinally of the vehicle is secured at its ends to said bracket and to a portion of the truck frame member below said pivotal connection, the securing of at least one end of said link to the corresponding frame member being of a yielding nature to accommodate the relative lateral movements of the frame members at the center connection.

6. In a railway vehicle, a body frame member, a radial truck frame member, individual concavo-convex center plates on said frame members internested with each other and being relatively rotatable to provide for swivelling of said members, at least one of said center plates being mounted on the corresponding frame member through a pad of rubber-like material with one face fixed relative to the back of the center plate and the other face fixed relative to the corresponding frame member, said pad extending in substantially straight lines from edge to edge transversely of the vehicle and being of sufficient thickness and resiliency to distort under shear to provide for shifting of the center plate to which the pad is fixed and the frame member on which it is mounted relative to each other horizontally transversely of the vehicle and to yieldingly resist such shifting to return the frame members to normal position.

7. A railway vehicle as described in claim 6 in which rigid elements adjacent the center plates provide a lost motion connection between the frames for transmitting forces applied between them longitudinally of the vehicle.

8. In a railway vehicle, a body frame member, a radial truck frame member having an upwardly facing concave center plate part, a body center plate part having a downwardly facing convex portion nested in said truck center plate part, there being vertically disposed elements on said parts for resisting horizontal forces between them and preventing displacement of said parts longitudinally of the vehicle, a pad of rubber-like material overlying said body center plate with its front and rear edges turned down over the front and rear edges of said body center plate, said body frame member being provided with means having a pocket formed therein receiving said rubber pad and body center plate and including vertically disposed elements opposing the front and rear edges of said body center plate and the down-turned edges of said pad, said vertically disposed elements resisting forces applied longitudinally of the vehicle between said frames and said center plates, and the adjacent portion of said truck frame member being movable laterally of said body frame member by the yielding of said pad to shearing forces.

9. In a railway vehicle, a body frame member, a radial truck frame member having a pivotal connection at one end to said body frame member and forming a support for said body frame member, the adjacent portion of one of said members at said connection forming a center plate, a separate center plate part adapted to rotatably engage said first mentioned center plate, a pad of rubber-like material engaging and interposed between said separate center plate part and the other of said members, the engaging surfaces of said pad being in fixed relation with said separate center plate part and said other member, the portions of said pad facing transversely of the vehicle being free of restraint so that the pad may distort under shear transversely of the vehicle and accommodate relative movement of said members at said connection transversely of said vehicle and yieldingly resist said transverse movement, there being means positively limiting relative movement of the members longitudinally of the vehicle.

10. In a railway vehicle, a body frame member, a radial truck frame member having a pivotal connection at one end to said body frame member and supporting said body frame member at points spaced longitudinally of the vehicle from said connection, said connection including a pad of rubber-like material with its upper face in fixed relation with one of said members and its lower face in fixed relation with the other of said members and being of sufficient thickness and flexibility to accommodate lateral displacement of the connected portions of said members from their normal relative positions and of sufficient resiliency to offer a yielding resistance to such displacement, the frame members being provided with elements opposing each other longitudinally of the vehicle and holding the frame members against substantial relative movement longitudinally of the vehicle but accommodating relative movement of said frame members, transversely of the vehicle, by the distortion of the rubber-like pad.

11. In a railway vehicle, a body frame member, a radial truck frame member having a center plate connection at one end to said body frame member and supporting said body frame member at points spaced longitudinally of the vehicle from said connection, said connection including individual plate-like elements and a pad of rubber-like material associated with said elements, said elements and pad being so constructed and arranged that said elements may have some movements angularly and horizontally of the vehicle relative to each other due to the yielding of said pad to shear and subject to the resistance of said pad to shear, and means associated with said elements to positively limit such relative movement of said elements transversely of the center plate axis irrespective of the action of said pad.

12. In a railway vehicle, a body frame member, a radial truck frame member having a pivotal connection at one end to said body frame member and supporting said body frame member at points spaced longitudinally of the vehicle from said connection, said connection including a center plate rigid with one of said members, a separate center plate engaging said rigid center plate, and a pad of rubber-like material with its one face in fixed relation with the other of said members and its other face in fixed relation with said separate center plate and being of sufficient thickness and flexibility to accommodate lateral displacement of said members from their normal relative positions and of sufficient resiliency to offer a yielding resistance to such displacement, the member to which the pad is fixed having vertically disposed elements facing longitudinally of the vehicle, said separate center plate being provided with opposing vertically disposed elements, and the pad including vertically disposed portions between said elements and resisting forces applied between said frame members longitudinally of the vehicle.

13. In a railway vehicle, a body frame member, a radial truck frame member having a pivotal connection at one end to said body frame member and supporting said body frame member at points spaced longitudinally of the vehicle from said connection, said connection including a center plate rigid with said one of frame members, a separate center plate associated with said rigid center plate and a pad of rubber-like material with one face in fixed relation with the other of said frame members and its other face in fixed relation with said separate center plate and being of sufficient thickness and flexibility to accommodate lateral displacement of the connected portions of said members from their normal relative positions and of sufficient resiliency to offer yielding resistance to such displacement, said center plates having faces opposing each other to resist forces applied between them in horizontal directions and said separate center plate and the member with which it is associated being provided with rigid elements opposing each other longitudinally of the vehicle, whereby forces applied between said frame members longitudinally of the vehicle are resisted by the engaging surfaces of said center plates and by said elements to prevent relative longitudinal displacement of said frame members.

14. In a railway vehicle, a body frame member, a radial truck frame member having a pivotal connection at one end to said body frame member and supporting said body frame member at points spaced longitudinally of the vehicle from said connection, said connection including a center plate rigid with said truck frame member, a separate center plate on said rigid center plate and a pad of rubber-like material with one face in fixed relation with said body frame member and its other face in fixed relation with said separate center plate and being of sufficient thickness and flexibility to accommodate lateral displacement of the connected portions of said members from their normal relative positions and of sufficient resiliency to offer yielding resistance to such displacement, said center plates having faces opposing each other to resist forces applied between them in horizontal directions and said body frame member having a pair of vertically disposed brackets at each side of said connection and spaced apart longitudinally of the vehicle and said separate center plate being provided with a projection at each side of said connection extending between a corresponding pair of said brackets and opposing the same longitudinally of the vehicle whereby forces applied between said frame members longitudinally of the vehicle are resisted by the engaging surfaces of said center plates and by the engagement of said brackets and said projections to prevent relative longitudinal displacement of said frame members.

15. A railway vehicle as described in claim 1 in which said pad of rubber-like material constitutes means to center the truck frame member relative to the body frame member when said pad is relieved of the forces causing relative lateral movement of said members.

JAMES C. TRAVILLA, Jr.